US010110339B2

(12) United States Patent
Jenkins et al.

(10) Patent No.: US 10,110,339 B2
(45) Date of Patent: Oct. 23, 2018

(54) METHOD AND APPARATUS FOR IMPROVING CONNECTIVITY BETWEEN OPTICAL DEVICES USING SOFTWARE DEFINED NETWORKING

(71) Applicant: Tellabs Operations, Inc., Naperville, IL (US)

(72) Inventors: David Jenkins, North Aurora, IL (US); Ramasubramanian Anand, Plainfield, IL (US); Joel Butz, Bolingbrook, IL (US)

(73) Assignee: TELL ABS OPERATIONS, INC., Naperville, IL (US)

( * ) Notice: Subject to any disclaimer, the term of this patent is extended or adjusted under 35 U.S.C. 154(b) by 0 days.

(21) Appl. No.: 15/656,658

(22) Filed: Jul. 21, 2017

(65) Prior Publication Data
US 2017/0324504 A1    Nov. 9, 2017

Related U.S. Application Data

(63) Continuation of application No. 14/640,797, filed on Mar. 6, 2015, now Pat. No. 9,716,563.

(51) Int. Cl.
*H04J 14/02* (2006.01)

(52) U.S. Cl.
CPC ...... *H04J 14/0212* (2013.01); *H04J 14/0204* (2013.01); *H04J 14/0217* (2013.01); *H04J 14/0267* (2013.01)

(58) Field of Classification Search
CPC .............. H04B 10/0795; H04J 14/0212; H04J 14/0267
See application file for complete search history.

(56) References Cited

U.S. PATENT DOCUMENTS

| | | | | |
|---|---|---|---|---|
| 2008/0181203 | A1* | 7/2008 | Jones | H04J 3/1664 370/353 |
| 2010/0082632 | A1* | 4/2010 | Kumar | H04L 41/5009 707/741 |
| 2015/0365189 | A1* | 12/2015 | Prakash | H04J 14/0227 398/34 |
| 2016/0057219 | A1* | 2/2016 | Kore | H04L 67/28 709/248 |

* cited by examiner

*Primary Examiner* — Dzung Tran
(74) *Attorney, Agent, or Firm* — James M. Wu; JW Law Group

(57) ABSTRACT

Method and apparatus of a network configuration configured to permit a dense wavelength division multiplexing ("DWDM") element to connect to a storage server, an Internet Protocol ("IP") router, and DWDM network are disclosed. The configuration includes the DWDM network, storage area network ("SAN") server, IP router, and optical transport network ("OTN") switch. While the DWDM network transports information via optical fibers, the DWDM switch is coupled to the DWDM network for transporting optical signals. The SAN server is coupled to a port of the DWDM switch and is configured to store data at a remote location. The IP router which is coupled to the DWDM switch facilitates IP traffic between a user and the DWDM network. The OTN switch, coupled to the first DWDM switch, is capable of processing at least a portion of the optical signals.

19 Claims, 7 Drawing Sheets

METHOD AND APPARATUS FOR IMPROVING CONNECTIVITY BETWEEN OPTICAL DEVICES USING SOFTWARE DEFINED NETWORKING

PRIORITY

This patent application is a continuation of U.S. patent application of U.S. patent application Ser. No. 14/640,797, filed on Mar. 6, 2015 in the name of the same inventor and entitled "Methods and Apparatus for Improving Connectivity between Optical Devices using Software Defined Networking," hereby incorporated into the present application by reference.

FIELD

The exemplary embodiment(s) of the present invention relates to telecommunications network. More specifically, the exemplary embodiment(s) of the present invention relates to optical networking.

BACKGROUND

With increasing demand for more information to be supplied to homes and/or businesses, network providers are constantly adding, expanding, upgrading, and/or switching their networks to improve overall optical communications network(s). Optical communications networks typically offer high-speed voice, video, and data transmission between users, such as providers, residential homes, businesses, government agents, and/or networks. Conventional optical networks include, but not limited to, fiber to the node/neighborhood ("FTTN"), fiber to the curb ("FTTC"), fiber to the building ("FTTB"), fiber to the home ("FTTH"), fiber to the premises ("FTTP"), or other edge location to which a fiber network extends. With increasing speed and capacity, optical networking becomes an integral part of digital communications network. To improve versatility of the optical network, various optical devices such as wave-division multiplexing ("WDM") elements have been developed to manipulate optical signals, such as routing, splitting, merging, and/or dropping optical signals.

To route optical signals between various optical nodes or devices, a WDM system, for example, may be employed to handle optical routing. The WDM system, for certain applications, is able to multiplex a number of optical signals with different wavelengths onto a single optical fiber. A wavelength may also be referred as a frequency or a color capable of traveling across an optical fiber. Different wavelengths, for instance, can be generated by different lasers. With a WDM network environment, a typical fiber may be configured to carry multiple sets of network traffic using different traffic wavelengths. For instance, a fiber can be configured up to 88 channels wherein each channel can transmit a specific type of wavelength containing optical information.

A conventional network includes multiple nodes. Each node is typically coupled with other nodes via one or more connections such as optical fibers and/or electrical cables. Since each fiber or optical fiber can carry multiple sets of frequencies or degrees of data traffic, inter-office fiber optic cabling at the node can be complicated. For example, a typical optical node can handle multiple degrees of data traffic using multiple fibers or fiber jumpers to route and/or process optical signals.

A problem associated with a typical optical network is that the connections between ports for facilitating traffic flow is predominantly provisioned as the static or permanent connections or links between network elements. A drawback associated with the static connection is that establishing a static link for handling short lived (hours, minutes, and/or seconds) connections, also known as "On Demand" services, is not the best approach to utilize the network resource.

SUMMARY

One embodiment of the present invention discloses a network configuration configured to permit a dense wavelength division multiplexing ("DWDM") element or switch to connect to a storage server and an Internet Protocol ("IP") router are disclosed. The configuration, in one aspect, includes a DWDM network, a storage area network ("SAN") server, an IP router, and an optical transport network ("OTN") switch. While the DWDM network transmits information via optical fibers, the DWDM switch routes optical signals to their destinations via the DWDM network. The SAN server is coupled to a port of the DWDM switch and is configured to backup data at a remote location. The IP router which is coupled to the DWDM switch facilitates IP traffic between users via the DWDM network. The OTN switch, coupled to the first DWDM switch, is capable of processing and/or grooming at least a portion of the optical signals.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
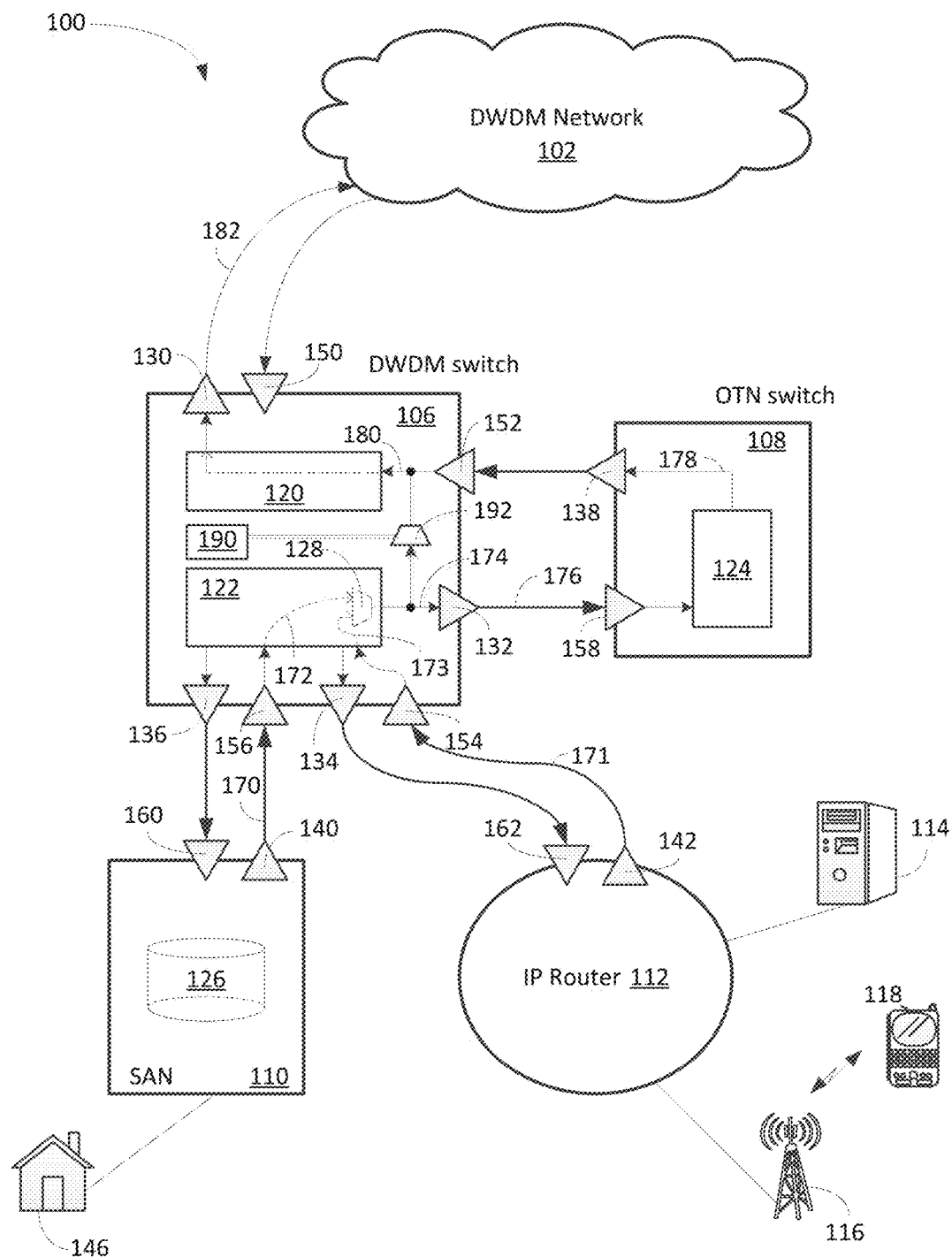
FIG. 1 is a block diagram illustrating an optical network configuration or topology using a DWDM switch to transmit optical data in accordance with one embodiment of the present invention.

Exemplary embodiment(s) of the present invention is described in context of a method and/or apparatus for node connectivity and port assignments relating to optical networking.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

The term "system" or "device" is used generically herein to describe any number of components, elements, subsystems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

Communication network means any type of network that is able to transmit data in a form of packets, cells, or frames. A communication network may be, for example, an IP communication network or an IP network carrying traffic packed in cells such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may include one or more of a satellite network, a DVB-RCS (Digital Video Broadcasting-Return Channel System) network, an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, the evolution of the UMTS known as LTE (Long Term Evolution), or DVB-H (Digital Video Broadcasting-Handhelds)), a hybrid (satellite and terrestrial) network, and/or an optical network.

An optical network uses light or photon energy to transmit information between various nodes of a communications network. The nodes can be placed within site(s), regional geographic locations, and/or metropolitan areas. To properly handle the light transmission, various optical devices or optical network element ("NE"), such as optical amplifiers, lasers, wave divisional multiplexing ("WDM") are used to transmit data across fiber-optic cables.

One embodiment of the present invention discloses a network configuration or topology configured to allow a DWDM NE or switch to couple to a storage server and an IP router. A DWDM NE can also be referred to as a DWDM switch, DWDM router, DWDM hub, DWDM machine, and the like. The configuration, also known as network topology, can include a DWDM network, a storage area network ("SAN") server, IP router, DWDM NE, and/or OTN switch.

A DWDM network links multiple geographically separated nodes together using optical connections as well as one or more DWDM switches. A function of DWDM switch is to transmit optical signals to their destinations via the DWDM network. The SAN server, which contains DWDM compliant transceiver(s), is connected to a port of the DWDM switch for data backup at a remote location. The IP router, which is coupled to the DWDM switch, facilitates IP traffic between users, content providers, network providers, and/or enterprises. An OTN switch which is coupled to the first DWDM switch is capable of processing and/or grooming at least a portion of the optical signals before sending the signals. For example, the OTN switch is able to merge multiple small sections of data into a larger entity of data that fills larger portion of a channel before transmitting the data.

FIG. 1 is a block diagram 100 illustrating an optical network configuration or topology using a DWDM switch to transmit optical data in accordance with one embodiment of the present invention. Diagram 100 includes a DWDM switch 106, DWDM network 102, OTN switch 108, SAN Server 110, and IP router 112. In one aspect, IP router 112 is coupled to server 114 and base station 116 wherein base station 116 provides wireless communication between end users such as mobile 118. It should be noted that the underlying concept of the exemplary embodiment(s) of the present invention would not change if one or more components (or elements) were added to or removed from diagram 100.

DWDM network 102 is an optical communication network capable of multiplexing multiple optical carrier ("OC") signals onto one fiber for transporting information from one or more sources to one or more destinations. To multiplex multiple OC signals, different wavelengths (i.e., colors) of DWDM compliant lasers may be employed. DWDM network 102 also enables bidirectional communications over a single fiber using different wavelengths. In a WDM system, various types of multiplexers are used at the transmitter or near the transmitter for merging different wavelengths. Demultiplexer can also be used at the receiving end or near the receiver to separate wavelengths. DWDM network 102 logically connects multiple nodes that are separated by geographic distances (i.e., network nodes) for network communication.

DWDM switch 106, also known as DWDM element or DWDM NE (network element), is able to transmit and receive optical signals to and from DWDM network 102. DWDM switch 106, in one aspect, includes a network interface 120, a device interface 122, an OTN bypass module 190, input ports 150-156, and output ports 130-136. Interfaces 120-122 and module 190 can be hardware, software, and/or a combination of hardware and software components. Network interface 120 is capable of facilitating optical communication between DWDM network and end user ("EU") devices such as SAN server 110 or IP router 112. For example, network interface 120 is able to receive the groomed data from OTN switch 108. Network interface 120 is also able to receive fully channeled traffic from bypass multiplexer 192 bypassing OTN switch 108.

Device interface 122 facilitates communication among/ between various devices such as, for example, EU devices, OTN switch 108, and OTN bypass module 190. In one embodiment, device interface 122, OTN bypass module 190, and network interface 120 are integrated into one component. For instance, DWDM switch 106 includes one or more reconfigurable optical add-drop multiplexers ("ROADMs") to implement network interface 122, device interface 120, and/or OTN bypass module 190. The ROADM, in one aspect, is able to route optical signals from SAN server 110 and/or IP router 112 to OTN switch 108 or directly to DWDM network 102 depending on the traffic. In addition, DWDM switch 106 also includes a network processing module able to receive SAN traffic from a specific and predefined SAN server 110, and subsequently forward the SAN traffic to OTN switch 108 for traffic grooming.

Input and output ("I/O") ports 130-136 and 150-156 of DWDM switch 106, in one embodiment, are assigned to a set of specific devices. For example, I/O ports 130, 150 are used to communicate with DWDM network 102, and I/O ports 132, 152 are assigned to communicate with OTN switch 108. Also, while I/O ports 134, 154 are allocated to communicate with IP router 112, I/O ports 136, 156 are dedicated to talk with SAN server 110. In the forgoing description, I/O ports 136, 156 may also be referred to as SAN I/O ports and I/O ports 134, 154 are referred to as IP I/O ports.

SAN server 110 includes storage 126 and I/O ports 140, 160 wherein the I/O ports 140, 160 are coupled to the SAN I/O ports of DWDM switch 106. SAN server 110 is dedicated to store or backup data at a remote location using SAN. SAN is generally not accessible through the local area network ("LAN") by other devices. EU 146, which can be a bank, is coupled to SAN server 110 for storage backup during off-peak hours via DWDM network 102. To communicate directly to DWDM switch 106, SAN server 110, in one aspect, includes a DWDM transceiver which can be part of I/O ports 140 or 160 to facilitate communication between SAN server 110 and DWDM switch 106 using WDWM signals. For example, output port 140 of SAN server 110 is coupled to the SAN input port 156 of DWDM switch 106 via a fiber 170 and is capable of sending a DWDM compliant optical signal from output port 140 to SAN input port 156 for storing data at a remote location. It should be noted that a DWDM transceiver is a DWDM compliant transmitter and receiver capable of handling DWDM wavelengths. For instance, a DWDM transceiver includes at least one DWDM compliant laser capable of generating and sending optical signals to a ROADM in the DWDM switch 106.

OTN switch 108 includes one or more optical network elements ("ONEs") 124 and I/O ports 138, 158, wherein ONEs are connected to I/O ports 138, 158 via optical connections such as connection 178 to provide functionality of transporting, multiplexing, switching, managing, and monitoring optical channels carrying data signals. For interdomain interfaces, OTN switch 108 is able to provide multiplexing functions including re-time, re-amplify, and re-shape ("3R"). In one aspect, OTN switch 108 includes a grooming module configured to provide traffic grooming involving traffic flows from SAN server 110 and IP router 112.

IP router 112 includes DWDM I/O ports 142, 162 and IP ports wherein the IP ports are coupled to server 114 and base station 116. Server 114, in one example, can be a content provider. Base station 116 is logically connected to multiple EUs via a wireless communication. IP router 112, in one embodiment, includes a DWDM compliant transceiver capable of communicating directly with DWDM switch 106. For instance, DWDM output port 142 is coupled to input IP port 154 via a fiber 171 for sending IP traffic. DWDM input port 162 coupled to output IP port 134 is able to receive optical data from output IP port 134 of DWDM switch 106.

The network configuration or topology illustrated in diagram 100 permits EU devices such as SAN server 110 and IP router 112 to directly connect to DWDM switch 106 instead of coupling to OTN switch. A benefit of the network topology is to save ports on the OTN switch(s) for certain network services such as on-demand services. The on-demand services, for example, are network services that switch periodically such as daily or weekly as opposed to long lived. The long lived switch or connection means connections remaining for a long period of time such as months or years depending on the applications. A bank, for example, backs up its data remotely during the nighttime which general requires a bandwidth of transmission for a short period of time on a periodical (i.e., daily) basis.

To manage time based services or on-demand services with enterprise quality of service, Software Defined Networking ("SDN") has been employed to achieve such time based traffic management. SDN, in one example, allows user or administrator to control the network services via lower-level functionality. SDN facilitates communication between the control plane and the data plane. To optically switch between NEs within a node or location, the DWDM system such as DWDM switch 106 may use route and select switching within such switches.

During a daytime operation, IP router 112 sends DWDM compliant IP traffic via output port 142 upon receipt of the IP traffic from connected EU devices, such as base station 112, server 114, or both. After arriving to IP input port 154 via fiber 171, the IP traffic travels to multiplexer or module 128 via connection 173. In one embodiment, multiplexer 128 shuts off path 172 since SAN server 110 should not send any traffic during the daytime. OTN bypass module 190 subsequently determines whether the IP traffic needs OTN switch service or not. If, for example, the traffic grooming (i.e., multiplexing, amplifying, etc.) is needed for at least a portion of the IP traffic, OTN output port 132 forwards the portion of IP traffic to input port 158 of OTN switch 108 via fiber 176. After traffic grooming, the processed IP traffic (or processed portion of the IP traffic) is forwarded from output port 138 of OTN switch 108 to input port 152 of DWDM switch 106. Upon arriving, network interface 120 forwards the IP traffic which has been groomed to DWDM network 102 via output port 130 and fiber 182. If the traffic grooming is not necessary, OTN bypass module 190 activates multiplexer 192 allowing the IP traffic to bypasses OTN switch 108 and directly travel to network interface 120 via multiplexer 192. For example, if the IP traffic uses full channel capacity, grooming may not be necessary and it can be sent directly to DWDM network 102.

During a nighttime operation, SAN server 110 instead of IP router 112 sends DWDM compliant SAN traffic via output port 140 upon receipt of the SAN traffic from connected EU devices such as server 146. After arriving to SAN input port 156 via fiber 170, the SAN traffic travels to multiplexer 128 via connection 172. In one embodiment, multiplexer 128 shuts off path 173 since it is the nighttime which is a designated time period for SAN service. OTN bypass module 190 subsequently determines whether the SAN traffic needs OTN service or not. If, for example, traffic grooming (i.e., multiplexing, amplifying, etc.) is needed, OTN output port 132 forwards the SAN traffic to input port 158 of OTN switch 108 via fiber 176. After traffic grooming, the groomed SAN traffic is forwarded from output port 138 of OTN switch 108 to input port 152 of DWDM switch 106. Upon arriving, network interface 120 forwards the SAN traffic which has been groomed to DWDM network 102 via output port 130 and fiber 182. If the traffic grooming is not necessary, OTN bypass module 190 activates multiplexer 192 allowing the SAN traffic to bypass OTN switch 108 and directly travel to network interface 120 via multiplexer 192.

An advantage of using the network topology illustrated in diagram 100 is that it enhances nodal and/or device connectivity while maintaining similar OTN switch ports for network services.

Figure 2:
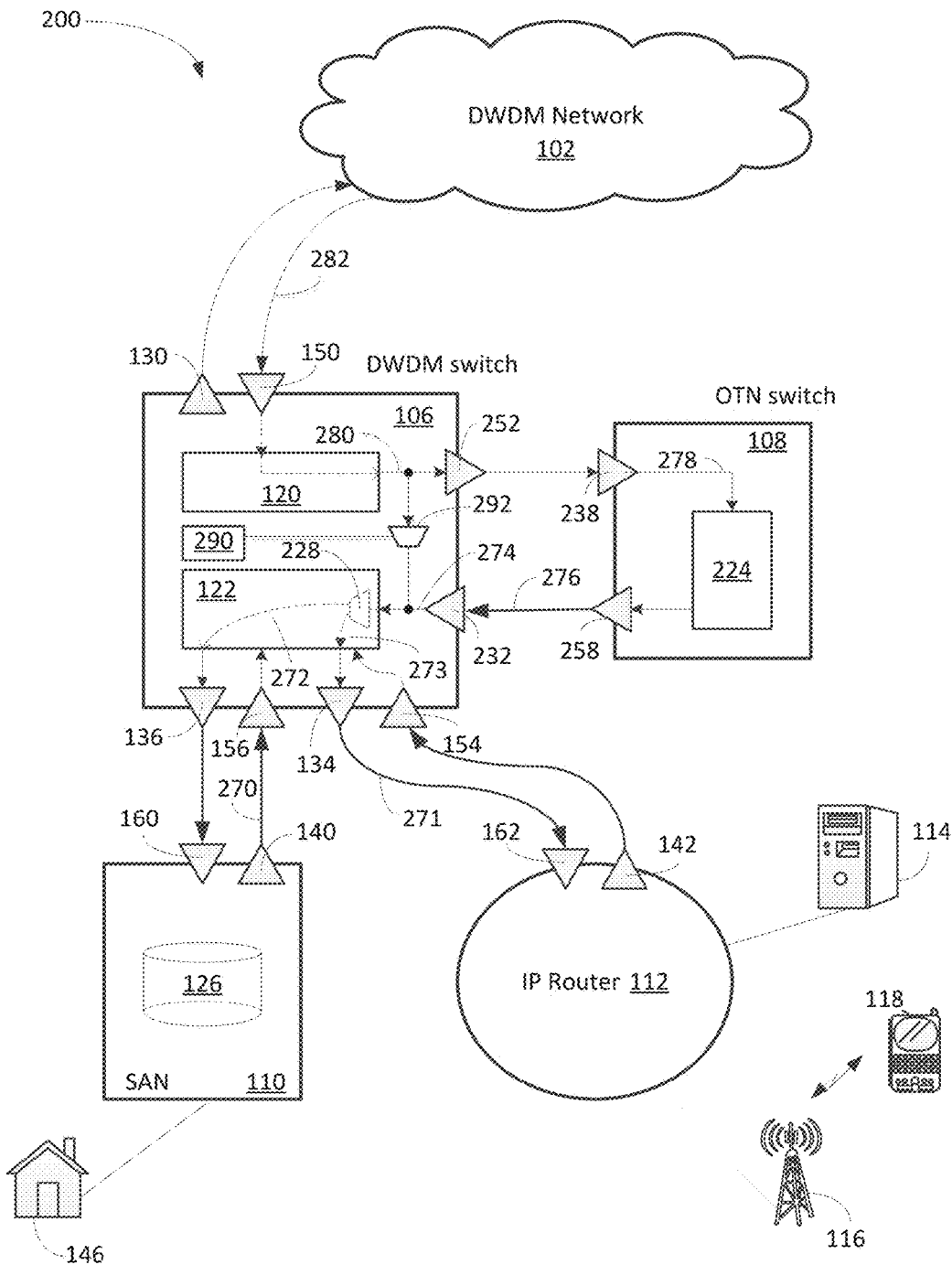
FIG. 2 is a block diagram illustrating an optical network configuration or topology using a DWDM switch to receive optical data in accordance with one embodiment of the present invention.

FIG. 2 is a block diagram 200 illustrating an optical network configuration using a DWDM switch to communicate with a DWDM network in accordance with one embodiment of the present invention. Diagram 200 is similar to diagram 100 illustrated in FIG. 1 except that diagram 200 shows traffic received from DWDM network 102 by DWDM switch 106. Diagram 200 includes DWDM switch 106, DWDM network 102, OTN switch 108, SAN server 110, and IP router 112. In one aspect, IP router 112 is coupled to server 114 and base station 116 wherein base station 116 provides wireless communication with end users such as mobile 118. It should be noted that the underlying concept of the exemplary embodiment(s) of the present invention would not change if one or more components (or elements) were added to or removed from diagram 200.

During an operation, an optical data flow is received at input port 150 of DWDM switch 106 from DWDM network 102 via a connection or fiber 282. After reaching network interface 120, the data flow is forwarded to OTN switch 108 if traffic processing such as demultiplexing of the data flow is needed. When the data flow arrives at input port 238 of OTN switch 108 from output port 252 of DWDM switch, the data flow is processed by ONE 224 of OTN switch 108. The processed data flow is subsequently sent from output port 258 of OTN switch 108 to input port 232 of DWDM switch 106. The processed data flow is subsequently forwarded to IP output port 134 if the destination of the data flow is IP router 112. Alternatively, if the destination of the data flow is SAN server 110, the processed data flow is sent to SAN output port 136. If, however, the traffic processing is not necessary, OTN bypass module 290 is activated which instructs multiplexer 292 to allow the data flow to directly flow from output 280 of network interface 120 to device interface 122.

An advantage of employing network configuration illustrated in diagram 200 is to save ports on OTN switch (or equivalent) 108 for time based network services such as On-Demand services. For example, the businesses that back up their data remotely require bandwidth for a short period time. The backup process, in one aspect, can be done during the late evening or night when IP services are at a low point. It should be noted that DWDM optical transmission can also combine data flows with different protocols.

The volume and speed requirements for IP traffic are generally greater than the requirements for SAN traffic. When the SAN traffic, for example, grows past the full optical channel, a second channel is required and needs to be added. The second channel is an on-demand channel with appropriate IP channel. To avoid increasing port numbers in the OTN switch, network configuration or topology illustrated in diagram 200 allows the channel(s) to be added to DWDM switch 106 instead of the OTN switch 108 whereby there is no need for full channel to route to the OTN switch 108 for grooming since it is routed by the DWDM switch 106. The connectivity is simplified and the number of ports on the OTN switch 108 stays the same so that the overall device lifetime and efficiency are enhanced.

An advantage of employing the network topology or configuration illustrated in diagram 200 is that the configuration is more adaptable to capacity expansion due to network demand. For example, the DWDM switches can be provisioned to add additional ports for capacity expansion.

Figure 3:
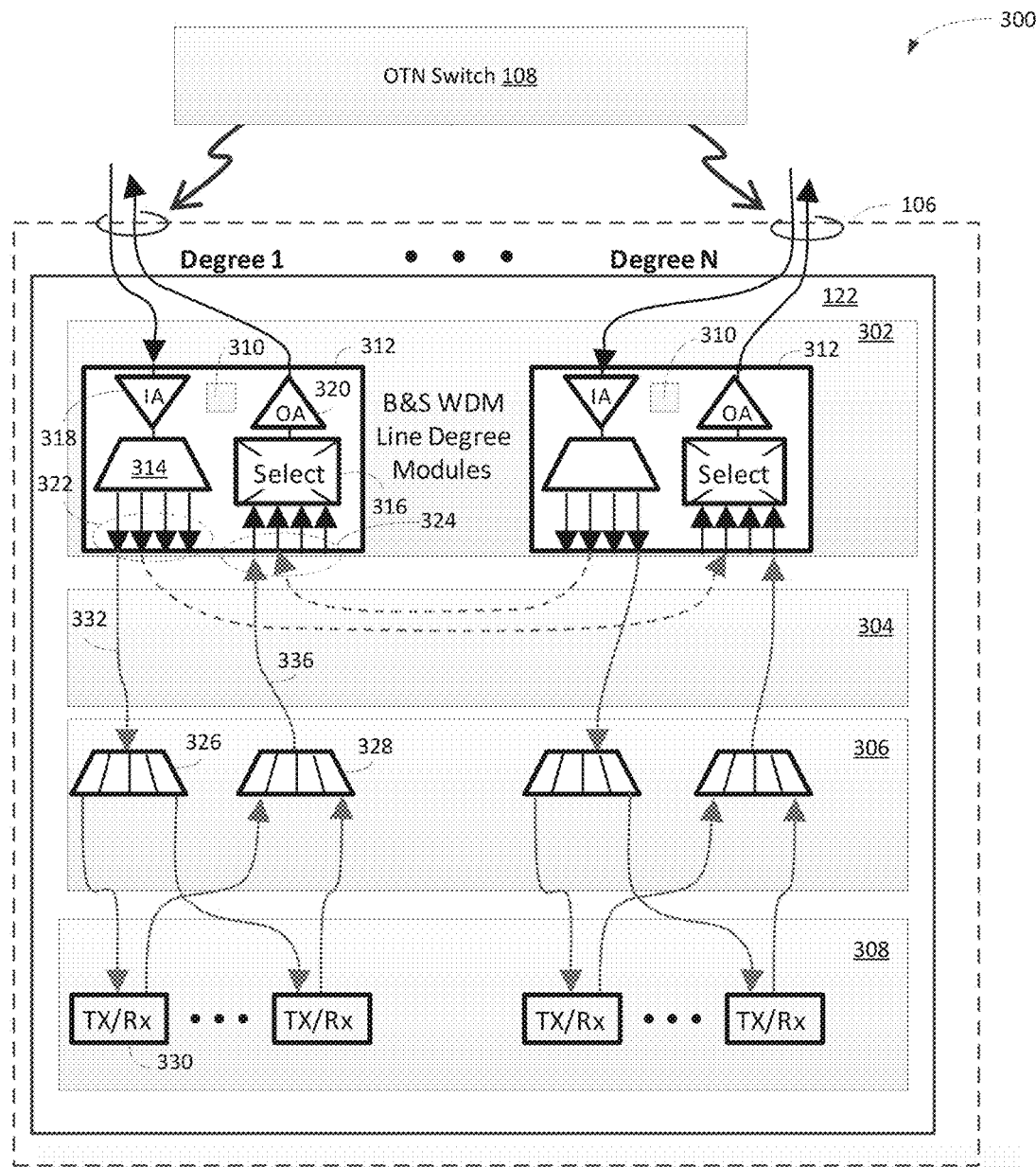
FIG. 3 is a block diagram illustrating a reconfigurable optical add-drop multiplexer ("ROADM") used in a DWDM switch in accordance with one embodiment of the present invention.

FIG. 3 is a block diagram 300 illustrating a reconfigurable optical add-drop multiplexer ("ROADM") used in DWDM switch 106 for optical signal routing or switching in accordance with one embodiment of the present invention. Diagram 300 includes OTN switch 108 and DWDM switch 106 containing device interface 122. Device interface 122 further includes a multi-degree ROADM that includes a line system 302, intra-nodal fiber connections 304, add-drop subsystems 306, and local transponders 308. To simplify forgoing discussion, the DWDM network, IP router(s), SAN server(s) are not included in diagram 300. It should be noted that the underlying concept of the exemplary embodiment(s) of the present invention would not change if one or more components (or elements) were added to or removed from diagram 300.

Line system 302, in one embodiment, includes one or more broadcast and select wavelength divisional multiplexing ("B&S WDM") line modules 312 for routing or distributing optical signals. Optical signals include light wavelengths, frequencies, light beams, photon energy, and/or optical traffic. Each B&S WDM line module 312, also known as line module, includes a passive coupler or splitter 314, a wavelength select switch ("WSS") 316, a line input amplifier ("IA") 318, and a line output amplifier ("OA") 320. In one example, an amplifier such as an Erbium Doped Fiber Amplifier ("EDFA") is used for the line output amplifier 320 and/or line input amplifier 318. Note that the line output amplifier 320 is used to transmit an optical signal from line module 312. The line input is configured to allow an optical signal to enter line module 312. A function of passive coupler 314 is to receive multiplexed signal(s), wavelengths, or frequencies from IA 318 and subsequently forward the received signal(s) to various output ports 322. Select WSS 316 is configured to receive various signals or frequencies from input ports 324 and subsequently forward a multiplexed optical signal to other optical modules via OA 320.

Intra-nodal fiber connections 304, in one aspect, include multiple optical fibers and/or optical fiber jumpers used for coupling various input and output ("I/O") ports between optical modules. In one example, intra-nodal fiber connections 304 include hundreds or thousands of optical fibers and/or jumpers for connecting and/or cabling I/O ports located at the same or different optical modules. To simplify the connections, a sorting device such as fiber shuffle may be used for fiber cabling and/or connecting.

Add-drop subsystem 306 illustrates multiple arrayed waveguides ("AWGs") 326 configured to provide fixed add and drop based optical routing function. It should be noted that optical routing function also ties to specific degree and wavelength. For example, AWG 326 is able to distribute or route different optical signals with different wavelengths upon receipt of an optical signal. The outputs from AWG 326 are fed to one or more transponders 330 based on a received optical signal such as signal 332. Note that signal 332 can be a multiplexed optical light containing multiple sets of data. Alternatively, AWG 328 is also capable of receiving multiple different optical signals or frequencies wherein the multiple signals are multiplexed into one multiplexed signal 336 which is subsequently forwarded to one of input ports 324 of line module 312 via intra-nodal fiber connections 304.

Local transponders 308 include multiple transponders 330 wherein each transponder 330 contains at least one pair of transmitter and receiver. In one aspect, transponder 330 is a wavelength-converting component that is able to convert data signals between optical and electrical signals. In one example, transponders 330 are physically situated closer to the end users. Alternatively, transponders 330 are able to separate multi-wavelength optical signal into individual data signals.

Diagram 300 illustrates a layout for a ROADM node which is used in a DWDM network environment. The DWDM network, for example, is able to handle at least 10 gigabits optical data transmission on a dispersion-managed fiber plant. Diagram 300 illustrates an N degree ROADM coupling to other ROADM modules in the network via fiber optic cables to N distant nodes, wherein N is an integer. Optical channels on interoffice fibers may be dropped at local transponders 308 or expressed to some other degree, such as "pass through", "transit", switching of "express traffic", or the like.

Figure 4:
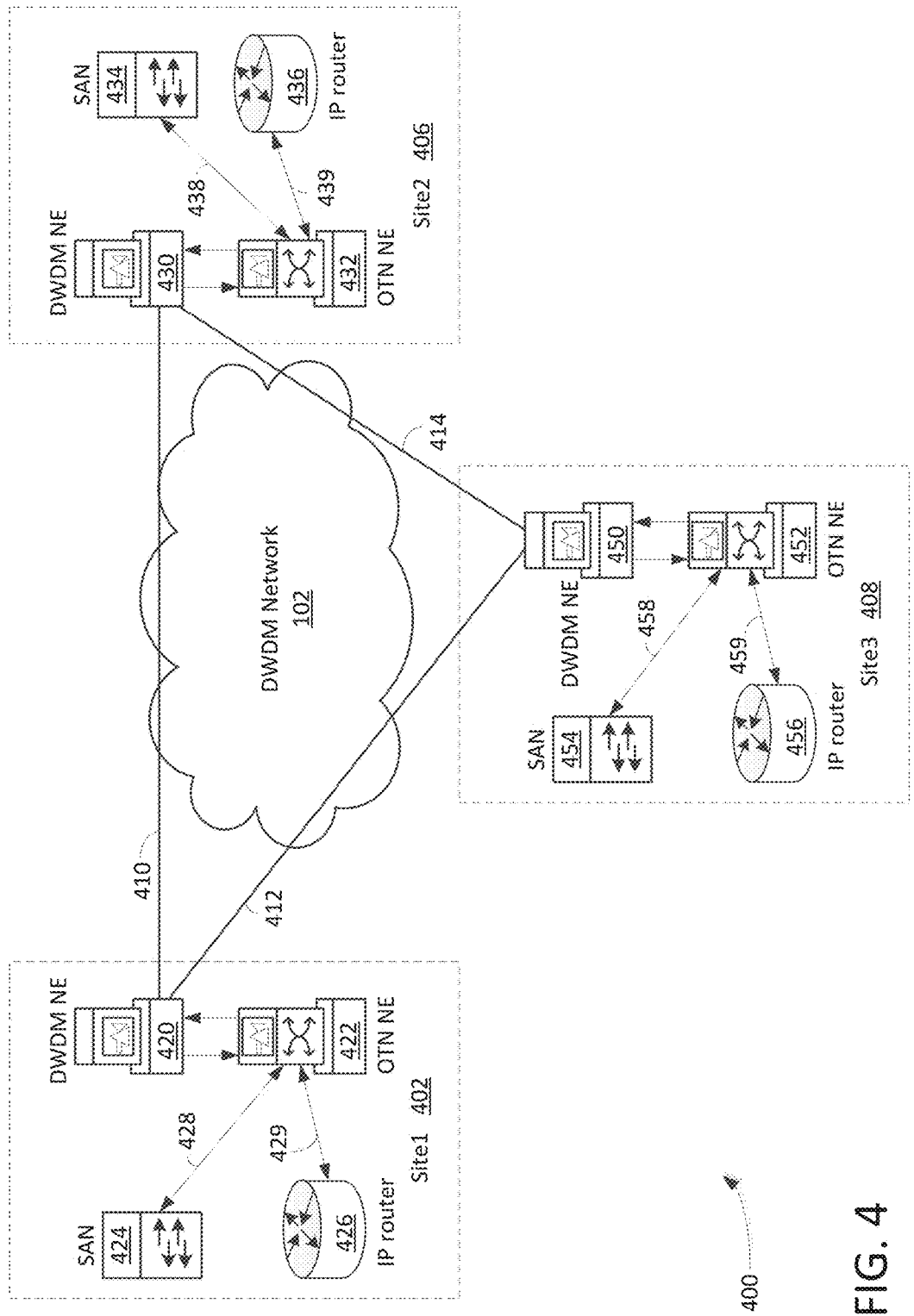
FIGS. 4-5 are block diagrams illustrating exemplary alternative configurations or topologies using DWDM switches in accordance with one embodiment of the present invention.
Figure 5:
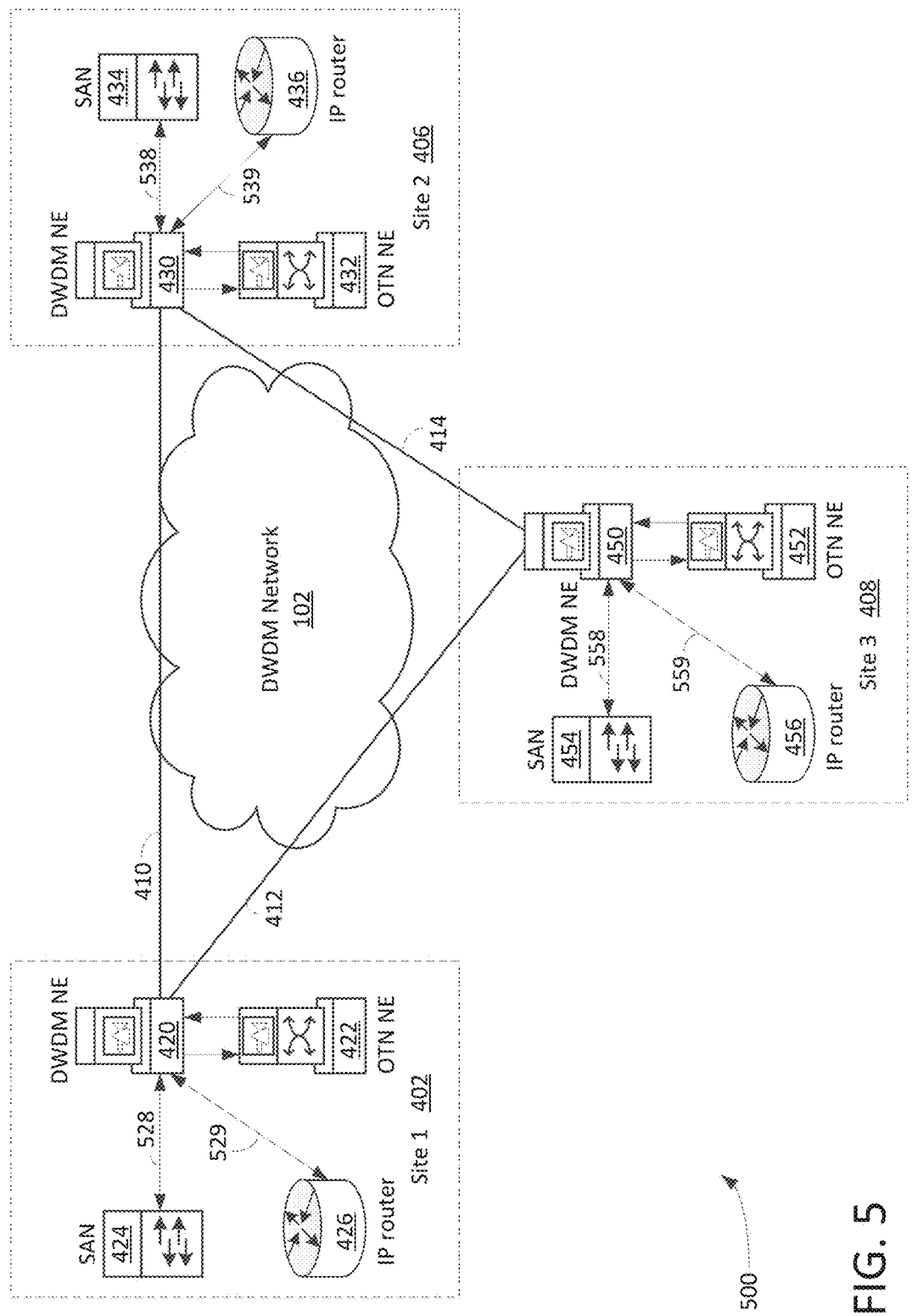

FIGS. 4-5 are block diagrams 400 and 500 illustrating exemplary network configurations or topologies using DWDM switches as hubs in accordance with one embodiment of the present invention. Diagrams 400 and 500 include three (3) sites 402-408, DWDM network 102, and connections 410-414 wherein connections 410-414 are used to facilitate communication between sites 402-408. Sites 402-408 can also be considered as network nodes that are separated by geographic distances. Each site includes a DWDM NE, OTN NE, SAN server, and IP router wherein the DWDM NE or switch, in one aspect, is used as hub for transmitting traffic flows between the DWDM network and EU's devices, such as IP router, SAN server, and OTN NE, as illustrated in diagram 500.

Diagram 400 illustrates a first topology having site1 402, site2 406, and site3 408. Site1 402 includes a DWDM NE or switch 420, an OTN NE or switch 422, a SAN server 424, and an IP router 426. Note that site1 402 may include additional NEs, switches, hubs, servers, and the like, but the additional device should not alter the underlying concept of the present embodiment. In one embodiment, SAN server 424 and IP router 426 are coupled to OTN NE 420 via connections or fibers 428-429. OTN NE 422 is able to access DWDM network 102 via the connections of DWDM NE 420. The term network element ("NE") and switch can be used interchangeably for simplicity.

Diagram 500 illustrates a second network topology having site1 502, site2 506, and site3 508. The second network topology is similar to the first topology except that the second topology uses DWDM NE as a primary NE for communicating between the DWDM network and EU devices such as SAN servers and IP routers. In one aspect, the DWDM NE 420 is used as a hub of a node or site configured to provide or facilitate communication between DWDM network 102 and SAN server 424, IP router 426, or OTN switch 422. For example, site1 502 includes DWDM NE 420, OTN NE 422, SAN server 424, and IP router 426 wherein SAN server 424 and IP router 426 are coupled or connected to DWDM NE 420 via connections or fiber 528-529. OTN NE 422 is also coupled to DWDM NE 420 and able to process traffic or a portion of the traffic if the traffic grooming is desirable.

The first or second network topologies or configurations shown in FIGS. 4 and 5 are capable of providing network services to one or more nodes or sites across one or more metropolitan areas with certain network access patterns. For example, IP traffic between enterprise customers and/or users is high during the daytime or business hours, and is low during the evening hours. Residential access, however, ramps up during the evening hours. The residential usage generally drops off the daytime (business hours) or night hours. Since network usage for enterprise and residential is generally minimal during the nighttime, it is usually a great time for an enterprise such as a bank or financial institution to backup its data to a remote location using SAN services.

The following examples show the different connectivity with different port count or usage between the first network topology and second network topology. In the examples, four (4) gigabits per second ("Gb/s") bandwidth is used as an exemplary capacity by SAN service during the nighttime network usage, and seven (7) Gb/s bandwidth of IP services is used as an exemplary capacity by IP service during the daytime and/or the evening time. The SAN services are routed though the access network to server such as SAN server 424. The IP traffic is general high during the daytime or even time while the SAN traffic is high during the nighttime. To simplify the examples, the SAN traffic is routed from Site 1 to Site 2 and the IP traffic is routed from Site 1 to Site 3. In one exemplary scenario, the network capacity grows four (4) Gb/s bandwidth in the SAN service and sever (7) Gb/S bandwidth in IP services every year or a period of time from the present time.

The first network topology as illustrated in diagram 400 illustrates a node network architecture capable of backing up data via SAN servers and delivering IP services via IP routers. SAN traffic generated by SAN server 424 and/or IP traffic generated by IP router 426, for example, can be wrapped up or combined using the OTN protocol. It should be noted that the traffic flows initiated by SAN or IP services do not necessarily occupy the full bandwidth of the optical channel. To enhance efficiency of optical network, traffic grooming which includes combining traffic flows can be desirable. In addition, multiple output ports may be needed for the OTN switch because the destination of traffic flows may be different. The following example illustrates multiple steps performed by the first network topology illustrating connectivity and port counts over a period of time.

Step 1, (starting point) nighttime SAN traffic is routed from the SAN server to the OTN switch including four (4) Gb/s of traffic in a ten (10) Gb/s optical link. This requires a ten (10) Gb/s port on the IP router connected to a ten (10) Gb/s port on the OTN switch. Another ten (10) Gb/s port as an output port of the OTN switch is needed to connect to the DWDM network onto Site 2. All of these optical links are approximately 40% filled.

The IP traffic flows, during the daytime and/or evening, are routed from the IP routers to the OTN switches consisting of seven (7) Gb/s of traffic in a ten (10) Gb/s rate optical link. A ten (10) Gb/s port on the IP router is required to connect to a ten (10) Gb/s port on the OTN switch. The same ten (10) Gb/s port used for the IP traffic output of the OTN switch can also be used to connect to the DWDM network onto site 3. During the daytime or evening time, the OTN NEs switch off the SAN traffic and allow the IP traffic to reach its destination. During the nighttime, the OTN switches off the IP traffic and allows the traffic to reach site 3. Most of the optical links are likely 70% filled. To accomplish described operation, a number of ports (i.e., 10 Gb/s port) in the DWDM equipment including, but not limited to, OTN switches, SAN servers, IP routers, and/or DWDM switches, needs to be identified and allocated. For example, the ten (10) Gb/s port count for the first network topology is five (5) since SAN server requires one (1) port, IP router requires one (1) port, and OTN switch requires three (3) ports.

Step 2, (growth phase) traffic capacity and requirements grow or expand overtime. For example, to fulfill an expansion of requirement, new four (4) Gb/s traffic with a total of eight (8) Gb/s traffic is needed for SAN service. Since the eight (8) Gb/s is within the capacity of optical link of ten (10) Gb/s, no additional port for connecting SAN server to OTN switch is required. The IP traffic requirements, however, double to 14 Gb/s from seven (7) Gb/s routing from IP routers to OTN switches. Transmitting 14 Gb/s IP traffic may require two ten (10) Gb/s ports whereby an additional ten (10) Gb/s port is needed. The SAN traffic, however, can still fit in the ten (10) Gb/s port to the DWDM network but the IP traffic will not fit. An additional ten (10) Gb/s port is required by the OTN switch for directing traffic to the DWDM NE. A ten (10) Gb/s connection from the SAN server to the OTN switch is needed, and two ten (10) Gb/s connections from the IP router to the OTN switch are required. Two ten (10) Gb/s connections from the OTN switch to the DWDM network are dedicated for communication. To accomplish the described operation, a number of ports (i.e., 10 Gb/s port) in the DWDM equipment including, but not limited to, OTN switches, SAN servers, IP routers, and/or DWDM switches, needs to be identified and allocated. For example, the ten (10) Gb/s port count of the second network topology is eight (8) since SAN Server requires one (1) port, IP router requires two (2) ports, and OTN switch requires five (5) ports.

Step 3, (more growth) traffic capacity or requirements grow overtime. For example, additional four (4) Gb/s traffic with a total of 12 Gb/s for SAN traffic is required for the SAN service. This requires one additional link from the SAN server to OTN switch since the additional traffic is beyond the capacity of a single ten (10) Gb/s link. The IP traffic capacity or requirements increase to 21 Gb/s from 14 Gb/s. This requires an additional ten (10) Gb/s ports from the IP router to OTN switch for a total of three ten (10) Gb/s ports. The SAN traffic can fit in the ten (10) Gb/s port to the DWDM network but the IP traffic will not fit. An additional ten (10) Gb/s port is required on the OTN switch. Two ten (10) Gb/s connections from the SAN server to the OTN switch are used and three ten (10) Gb/s connections from the IP router to the OTN switch are used. Three ten (10) Gb/s connections from the OTN switch to the DWDM network are required. To accomplish the described operation, a number of ports (i.e., 10 Gb/s port) in the DWDM equipment including, but not limited to, OTN switches, SAN servers, IP routers, and/or DWDM switches, needs to be identified and allocated. For example, the ten (10) Gb/s port count of the first network topology is thirteen (13) since SAN Server requires two (2) ports, IP router requires three (3) ports, and OTN switch requires eight (8) ports.

Step N, (more growth) traffic requirement continues to grow overtime. For example, SAN traffic grows four (4) Gb/s every year or every predefined period of time while IP traffic increases seven (7) Gb/s for the same period of time. The mathematical expression is N×4 Gb/s for SAN traffic and N×7 Gb/s IP traffic, wherein N is an integer. A total of $N_{SAN}$ 10 Gb/s ports from the SAN server to OTN switch and $N_{IP}$ Gb/s ports from the IP router to OTN switch are required. The mathematical formula is, $N_{SAN}$=roundup (N×4/10) and $N_{IP}$=roundup (N×7/10) where roundup means to roundup to the next highest integer. Note that $N_{SAN}<N_{IP}$ so there are $N_{IP}$ 10 Gb/s links from the OTN switch to the DWDM network.

Referring back to FIG. 4, diagram 400 illustrates one embodiment of the first network topology wherein the ten (10) Gb/s port count for the first network topology can be identified or calculated by the following formula: 10 Gb/s port count equals to SAN Server $N_{SAN}$+IP router $N_{IP}$+OTN switch $N_{SAN}+N_{IP}+\max(N_{SAN},N_{IP})$, where N is an integer.

The second network topology illustrated in FIG. 5 includes SAN servers, IP routers, OTN switches, and DWDM NEs wherein each DWDM NE is configured to couple to at least one SAN server, IP router, and OTN switch. The DWDM NEs are also configured to communicate with other DWDM NEs situated in different sites or locations via the DWDM network such as DWDM network 102. When channel capacity of an optical link is greater than the traffic flow, the traffic flow, in one example, is forwarded from the DWDM element to the OTN switch for traffic grooming. For instance, multiple small traffic flows could be merged or multiplexed onto a single optical link or channel. After traffic grooming, the processed traffic (or groomed traffic) is forwarded back to the DWDM element for transmission. The following example illustrates multiple steps performed by the second network topology providing connectivity and port count over a period of time.

Step 1: (starting point) Nighttime SAN traffic is routed from the SAN server consisting of four (4) Gb/s of traffic in a ten (10) Gb/s optical link from the SAN server to the DWDM NE. When grooming is desirable, the traffic is forwarded to the OTN switch from the DWDM NE. After OTN processing (or grooming) the processed traffic is sent back to the DWDM NE from the OTN switch. The traffic is subsequently routed to the DWDM network.

The laser on the SAN server, in one embodiment, is a DWDM compliant device. In one aspect, the DWDM compliant device means a signal is sufficiently narrow and the signals are generated within a predefined range of wavelengths whereby the signals can pass through the DWDM equipment. In one example, the DWDM equipment such as DWDM NE includes a special card to accommodate switching within a single node. The special card, for instance, may include ROADM component which is able to be plugged in the DWDM NE for node switching. A ten (10) Gb/s port of OTN switch, for example, outputting traffic to DWDM network 102 through DWDM NE may contain data capacity less than 100% link capacity. For the instant example, the link capacity is approximately 40% filled.

During the daytime and/or evening time, IP traffic is routed from the IP router (i.e., IP router 426) to the OTN switch (i.e., OTN NE 422) consisting of seven (7) Gb/s of traffic in a ten (10) Gb/s rate optical link via the DWDM NE, and then the processed traffic is sent from OTN switch back to the DWDM NE. The traffic is outputted to the DWDM network (i.e., DWDM network 102) via the DWDM NE. The laser(s) used in the IP router like the ones in the SAN server(s) are DWDM compliant light emitting devices ("LEDs").

A DWDM compliant device, in one example, generates a signal within a narrow range of predefined wavelength that allows the signal to pass through the DWDM equipment. To handle DWDM signals, the DWDM NE requires a special card or component such as ROADM component to handle the signal switching within a node. The ten (10) Gb/s output port used for the IP traffic of the OTN switch is used to connect to an input port of the DWDM NE whereby allowing the DWDM NE to forward the IP traffic to its destination via the DWDM network. To accomplish the described operation, the number of ports (i.e., 10 Gb/s port) in the DWDM equipment can be identified and allocated. For example, the ten (10) Gb/s port count for the second network topology is four (4) since SAN Server requires one (1) port, IP router requires one (1) port, and OTN switch requires two (2) ports.

Step 2: (growth phase) the traffic capacity and/or requirements grow or expand overtime (or in a future time). For example, to fulfill an expansion requirement, four (4) additional Gb/s traffic with a total of eight (8) Gb/s traffic is required for the SAN traffic. Since the eight (8) Gb/s capacity is within the link capacity of ten (10) Gb/s, no additional port for connecting SAN server to OTN switch is required. The IP traffic requirements, however, double to 14 Gb/s from seven (7) Gb/s routing from the IP router to the OTN switch through the DWDM NE. Transmitting 14 Gb/s IP traffic requires two ten (10) Gb/s ports whereby an additional ten (10) Gb/s port for the IP router may be needed.

Note that a portion of IP traffic four (4) Gb is routed from the IP router to the OTN switch to groom the four (4) Gb/s traffic into a ten (10) Gb/s rate optical link. The groomed IP traffic is subsequently forwarded to the DWDM NE before it is being shipped to the DWDM network. Since the IP traffic destination is Site 3, a full ten (10) Gb/s link is used to route from the IP router through the DWDM NE to Site 3 via the DWDM network. To accomplish the described exemplary operation, the second network topology requires a number of ports (i.e., 10 Gb/s port) in the DWDM equipment. For example, the ten (10) Gb/s port count for the second network topology is five (5) since SAN Server requires one (1) port, IP router requires two (2) ports, and OTN switch requires two (2) ports.

Step 3: (future growth) traffic capacity and/or requirement continues to grow overtime. For example, an additional four (4) Gb/s for a total of 12 Gb/s are required for the SAN traffic. During the nighttime, SAN traffic is routed from the SAN server to the OTN switch consisting of 2 Gb/s of traffic in a ten (10) Gb/s optical link to the OTN switch for traffic processing or grooming. After processing or grooming, the traffic is forwarded back to the DWDM NE and the traffic is subsequently forwarded to its destination via the DWDM network. Since all traffic is destined to Site 2, one full ten (10) Gb/s routing from the SAN server through the DWDM NE, and subsequently forwarded it to Site 2 via the DWDM network.

The IP traffic capacity and requirements, in one aspect, grow to 21 Gb from previously 14 Gb routed from the IP router through the DWDM NE to the OTN switch. 21 Gb/s IP traffic requires three (3) ten (10) Gb/s ports to transmit. A new ten (10) Gb/s port in addition to the existing two ten (10) Gb/s ports of the IP router is needed. The IP traffic is routed to Site 3 via the DWDM network and the DWDM NE. In one example, IP traffic is routed from IP router 426 to OTN switch 422 for grooming one (1) Gb/s of traffic in a ten (10) Gb/s rate optical link via DWDM NE 420. After processing, the IP traffic which is just a portion of the entire IP traffic is routed from OTN switch 422 to DWDM network 102 via DWDM NE 420. To accomplish the described exemplary operation, the second network topology requires a number of ports (i.e., 10 Gb/s port) in the DWDM equipment. For example, the ten (10) Gb/s port count of the second network topology is seven (7) since SAN Server requires two (2) ports, IP router requires three (3) ports, and OTN switch requires two (2) ports.

Step N: (future growth) traffic requirement continues to grow overtime, where N is an integer. For example, N×4 Gb/s of SAN traffic is required for the nighttime data backup at a remote destination such as Site 2 for after a period of time. To identify port requirement, the number of ten (10) Gb/s ports (N) required for SAN ($N_{SAN}$) can be calculated by rounddown (N×4/10) equals, where rounddown means to round down to the next lowest integer. There are (N×4−$N_{SAN}$*10) Gb/s of SAN traffic routed from the SAN server to the OTN switch in a ten (10) Gb/s optical link from the SAN server to the DWDM NE. The SAN traffic is then sent back to the DWDM NE before being transmitted to the DWDM network. N×7 Gb/s of IP traffic is required at night destined for Site 3. For IP traffic, there are rounddown (N×7/10)=$N_{IP}$ 10 Gb/s ports to the DWDM NE out to site 3. There are (N×4−$N_{IP}$*10) Gb/s of SAN traffic routed from the IP router to the OTN switch in a ten (10) Gb/s optical link.

Referring back to FIG. 5, diagram 500 illustrates one embodiment of the second network topology wherein the ten (10) Gb/s port count can be identified or calculated by the following mathematic formula: ten (10) Gb/s port count equals SAN server $N_{SAN}$, IP router $N_{IP}$, and OTN switch 2, where N is an integer.

Figure 6A:
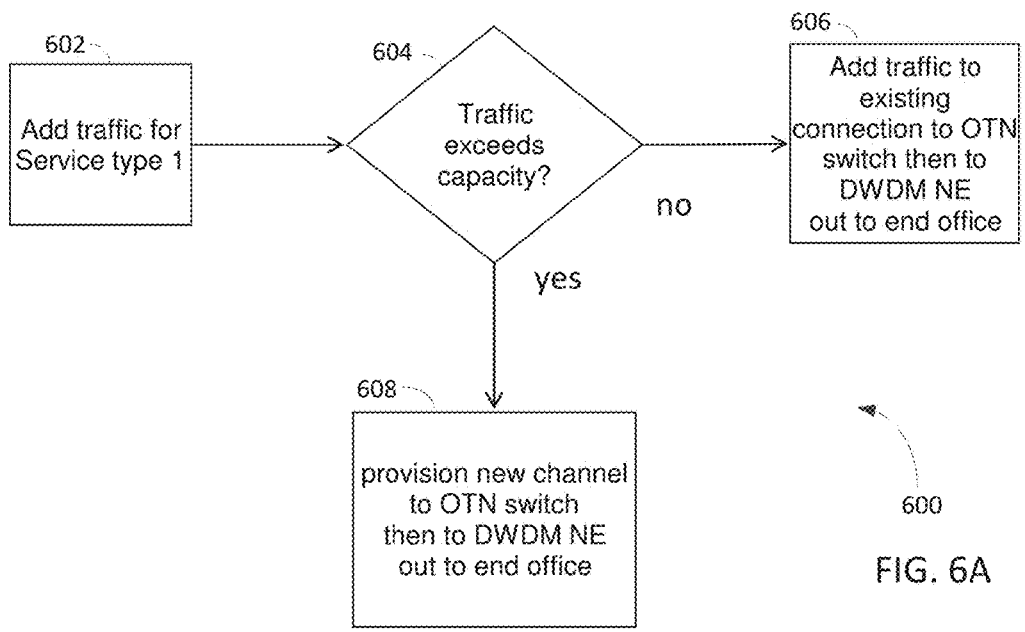
FIGS. 6A-6B are flowcharts illustrating alternative configurations in accordance with one embodiment of the present invention.
Figure 6B:
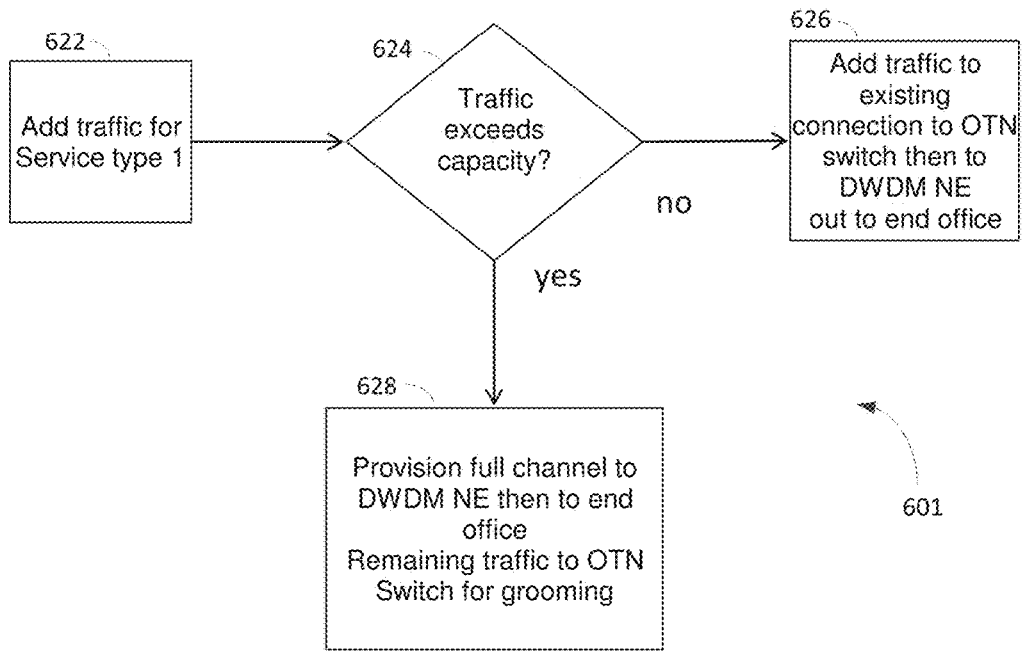

FIGS. 6A-6B are flowcharts 600-601 illustrating two network topologies or configurations in accordance with one embodiment of the present invention. Flowchart 600 illustrates a process of a first network topology illustrated in FIG. 4. At block 602, the process adds traffic for a type of service such as SAN service or IP service. The process, in one embodiment, determines at block 604 whether the traffic capacity exceeds the link capacity. If it does, the process proceeds to block 608. At block 608, a new channel to OTN switch is provisioned or obtained. After provisioning, the traffic is routed to DWDM NE which subsequently sends the traffic to the end office via the DWDM network. If, at block 604, the traffic capacity does not exceed the link capacity, the process proceeds to block 606 where the additional traffic is added to the existing connection to the OTN switch. After adding traffic to the existing link channel, the process sends the traffic with the added traffic to the end office via DWDM NE.

Flowchart 601 illustrates a process of the second network topology illustrated in FIG. 5. At block 622, the process adds traffic to a type of service such as SAN service or IP service. The process, in one embodiment, determines at block 624 whether the added traffic exceeds the link capacity. If it does, the process proceeds to block 628. At block 628, while the full channeled traffic are sent to the end office via DWDM NE, the remaining traffic is forwarded to the OTN switch for traffic grooming. If, at block 624, the added traffic does not exceed the link capacity, the process proceeds to block 626 where the additional traffic is added to the existing connection to the OTN switch. After grooming and/or processing by the OTN switch, the traffic with the added traffic is sent to the end office via DWDM NE.

The second network topology uses SDN to save certain number of ports on the OTN switch so that the second network topology is more adaptable to the future network growth. The use of optical switching managed through SDN provides an automated way of evolving to more efficient optical network. There are variations of this algorithm based on network topology, actual traffic growth or other factors. One variation is the common use of the port on the OTN switch or WDWM NE. The traffic from the SAN server and the IP router can be running at different time and there can use the common ports on the OTN switch. The SAN protocols are usually different from the IP protocols. However, the IP protocols used for web-surfing and/or file transfer are the same protocols whereby they could share the common port(s). Also, the video services (dominate in evening traffic) may also be similar to IP protocol(s) and can use the same common ports.

Another variation is different bit rates or speeds of traffic flows. Depending on the applications, a SAN server may use 8 Gb/s, 40 Gb/s, 100 Gb/s, or the like based on the configuration of the network. It should be noted that the transmissions in the DWDM system are bit-rate independent if the traffic passes through the DWDM element.

Another variation is the type of equipment. Note that the SAN server and the IP router can be connected to multiplexing cards in the DWDM NE. The second network topology uses one multiplexing card for SAN traffic, one multiplexing card for IP traffic, and allows full channels passing directly through the DWDM element from DWDM compliant optics on each of the servers.

Table 1 (see below) illustrates a summary showing OTN ports used or saved in connection to first network topology ("FNT") shown in FIG. 4 and second network topology ("SNT") shown in FIG. 5. Table 1 uses four (4) Gb/s of SAN traffic and seven (7) Gb/s of IP traffic. Table 1 shows OTN port requirement in view of number of destinations and number of steps.

TABLE 1

|      | OTN ports | | | | | |
| --- | --- | --- | --- | --- | --- | --- |
|      | 1 destination | | 2 destinations | | 3 destinations | |
| Step | FNT | SNT | FNT | SNT | FNT | SNT |
| 1  | 3  | 3 | 6  | 4 | 8  | 5 |
| 2  | 5  | 3 | 7  | 4 | 9  | 5 |
| 3  | 8  | 3 | 11 | 4 | 11 | 5 |
| 4  | 8  | 3 | 11 | 4 | 11 | 5 |
| 5  | 10 | 3 | 12 | 4 | 15 | 5 |
| 6  | 13 | 3 | 18 | 4 | 17 | 5 |
| 7  | 13 | 3 | 18 | 4 | 17 | 5 |
| 8  | 16 | 3 | 20 | 4 | 22 | 5 |
| 9  | 18 | 3 | 23 | 4 | 26 | 5 |
| 10 | 18 | 3 | 23 | 4 | 26 | 5 |

The exemplary embodiment of the present invention includes various processing steps, which will be described below. The steps of the exemplary embodiment of the present invention may be embodied in machine or computer executable instructions. The instructions can be used to cause a general purpose or special purpose system, which is programmed with the instructions, to perform the steps of an exemplary embodiment of the present invention. While embodiments of the present invention will be described with reference to the DWDM network, the method and apparatus described herein is equally applicable to other network infrastructures or other data communications environments.

Figure 7:
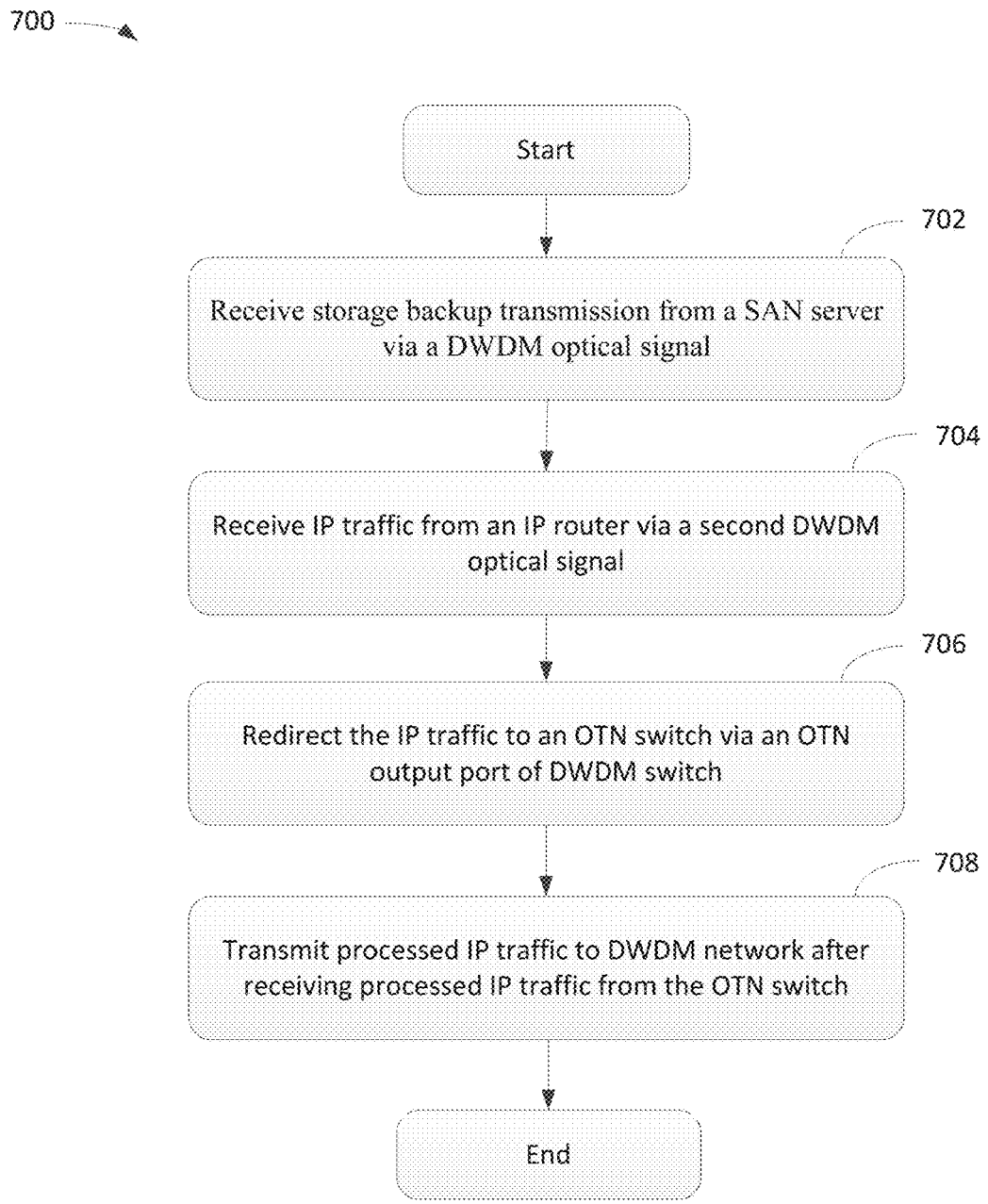
FIG. 7 is a flowchart illustrating an exemplary process of DWDM switch capable of communicating with SAN server and IP router in accordance with one embodiment of the present invention.

FIG. 7 is a flowchart 700 illustrating an exemplary process of DWDM switch capable of communicating with SAN server and IP router in accordance with one embodiment of the present invention. At block 702, a process capable of transmitting optical data via DWDM network is able to receive a storage backup transmission from a first SAN server via a first DWDM optical signal. In one example, optical data generated in accordance with DWDM standard is received at a first SAN input port of the DWDM switch.

At block 704, a first IP traffic from a first IP router via a second DWDM optical signal generator is received. In one aspect, the process is capable of receiving an optical data flow generated in accordance with the DWDM standard at a first IP input port of the DWDM switch.

At block 706, the IP traffic is redirected to a first OTN switch from an OTN output port of the DWDM switch for processing at least a portion of the first IP traffic such as traffic grooming. After processing, the processed or groomed first IP traffic from the OTN switch is received at an input port to the DWDM switch. For example, various small IP traffic or data flows may be grouped or regrouped into larger entities before transmission.

At block 708, the processed first IP traffic is transmitted via the output port of the DWDM switch to its destination via the DWDM network. In one aspect, the storage backup transmission can also be redirected or forwarded to the first OTN switch from the OTN output port of the DWDM switch for processing or grooming if the SAN traffic or at least a portion of the SAN traffic needs to be processed before transmission. After processing, the groomed (or processed) SAN traffic (or storage backup transmission) is forwarded to the input port to the DWDM switch from the OTN switch. Alternatively, the process is also capable of receiving second SAN traffic from a second SAN server. The second SAN traffic is represented by a set of second SAN DWDM optical signals generated by a DWDM compliant laser or generator. Upon redirecting the SAN traffic to a second OTN switch for processing the SAN traffic if traffic grooming is desirable, the processed SAN traffic is forwarded to its destination via the DWDM network as soon as the processed SAN traffic is received by the DWDM NE from the second OTN switch. Note that the process is also capable of receiving a second IP traffic from a second IP router.

An advantage of employing a network configuration using DWDM NE or switch to communicate with DWDM network and EU's devices (i.e., IP routers, SAN servers, etc.) is that the network configuration is more adaptable to on-demand network connection as well as future expansion.

While particular embodiments of the present invention have been shown and described, it will be obvious to those skilled in the art that, based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A network switch coupled to a dense wavelength division multiplexing ("DWDM") network, comprising:
a network interface coupled to a DWDM network and configured to provide interface with the DWDM network;
a device interface coupled to the network interface and configured to interface with a network router facilitating communication between the DWDM network and user devices;
an optical transport network ("OTN") bypass module coupled to the network interface and configured to selectively bypass at least a portion of traffic from a coupled OTN switch in response to a predefined set of bypassing condition; and
a bypass multiplexer coupled to the OTN bypass module and configured to facilitate selectively bypassing the traffic from the OTN switch in response to content of the traffic.

2. The network switch of claim 1, further comprising a plurality of storage area network ("SAN") input and output ("I/O") ports coupled to the device interface and configured to facilitate communication between a SAN server and the DWDM network.

3. The network switch of claim 2, wherein the SAN server having a DWDM transceiver and is able to backup data at a remote location utilizing SAN.

4. The network switch of claim 1, wherein the DWDM network is able to transport information via a plurality of optical fibers and is configured to logically link multiple geographic distanced nodes together for network communication.

5. The network switch of claim 1, wherein the OTN switch having an OTN port is configured to process at least a portion of the optical signals sent to the DWDM network.

6. The network switch of claim 1, wherein the network router is a first Internet Protocol ("IP") router coupled to an IP port of the network switch and configured to facilitate IP traffic between a user and the DWDM network.

7. The network switch of claim 1, further comprising a reconfigurable optical add-drop multiplexer ("ROADM").

8. The network switch of claim 7, wherein the ROADM is configured to route optical signals between an SAN server, IP router, and the DWDM network.

9. The network of claim 1, wherein the OTN switch includes a grooming module configured to provide traffic grooming involving traffic flows from an SAN and the IP router.

10. The network of claim 1, further comprising a network processing module able to receive SAN traffic from an SAN server and forward at least a portion of the SAN traffic to the OTN switch for traffic grooming.

11. An optical network configuration, comprising:
a first storage area network ("SAN") server configured to process SAN traffic and a first Internet Protocol ("IP") router configured to handle IP traffic;
a first optical transport network ("OTN") switch configured to process at least a portion of optical signals before sending processed signals to their destination via a wavelength divisional multiplexing ("WDM") network;
a first WDM switch, coupled to the first SAN server, the first IP router, and the first ONT switch, configured to select one of the first SAN server, first IP router, and first OTN switch to communicate with the WDM network in accordance with a set of predefined conditions;
a second SAN server configured to process SAN traffic and a second IP router configured to handle IP traffic;
a second OTN switch configured to process at least a portion of optical signals before sending processed signals to their destination via the WDM network; and
a second WDM switch, coupled to the second SAN server, the second IP router, and the second ONT switch, configured to select one of the second SAN server, second IP router, and second OTN switch to communicate with the WDM network in accordance with a second set of predefined conditions.

12. The configuration of claim 11,
wherein the WDM network is a dense wavelength division multiplexing ("DWDM") network configured to transport optical information; and
wherein the first WDM switch includes a SAN port, an IP port, an input OTN port, an output OTN port, and a DWDM output port.

13. The configuration of claim 12,
wherein the SAN port is coupled to the first SAN server and the IP port is coupled to the first IP router; and
wherein the input OTN port and the output port are coupled to the first OTN switch.

14. The configuration of claim 11, wherein the first DWDM switch includes a reconfigurable optical add-drop multiplexer ("ROADM") for routing at least one of the SAN traffic and the IP traffic.

15. The configuration of claim 11, wherein the first OTN switch includes a grooming module configured to provide traffic grooming involving in traffic flows from the first SAN and the IP router.

16. The configuration of claim 11, wherein the first DWDM switch includes a network processing module able to receive SAN traffic from the first SAN and forward the SAN traffic to the OTN switch for traffic grooming.

17. A method for transmitting data over a communication network, comprising:
receiving first Internet Protocol ("IP") traffic from a first IP router via a dense wavelength divisional multiplexing ("DWDM") optical signal;
identifying which portion of the first IP traffic to bypass a first OTN switch;
directing at least a portion of the first IP traffic to the first OTN switch from an OTN output port of a DWDM switch for processing the first IP traffic;
transmitting processed first IP traffic via an output port of the DWDM switch to a DWDM network after receiving the processed first IP traffic from the first OTN switch;
receiving a storage backup transmission from a first storage area network ("SAN") server via a stream of WDM optical signals; and
redirecting the storage backup transmission to the first OTN switch from the OTN output port of the DWDM switch for processing the storage backup transmission.

18. The method of claim 17, wherein the redirecting at least a portion of the IP traffic includes assigning a first ten (10) gigabits ("Gb") of 14 Gb IP traffic to a first ten (10) Gb per second ("Gb/s") optical link and sending the first ten (10) Gb to its destination through an output port of the DWDM switch via the DWDM network.

19. The method of claim 17, further comprising:
receiving second IP traffic from a second IP router via a second DWDM optical signal;
identifying which portion of the second IP traffic to bypass the second OTN switch;
directing at least a portion of the second IP traffic to the second OTN switch from an OTN output port of a second DWDM switch for processing the second IP traffic; and
transmitting processed second IP traffic via an output port of the DWDM switch to a DWDM network after receiving the processed second IP traffic from the first OTN switch.

* * * * *